Figure 1:
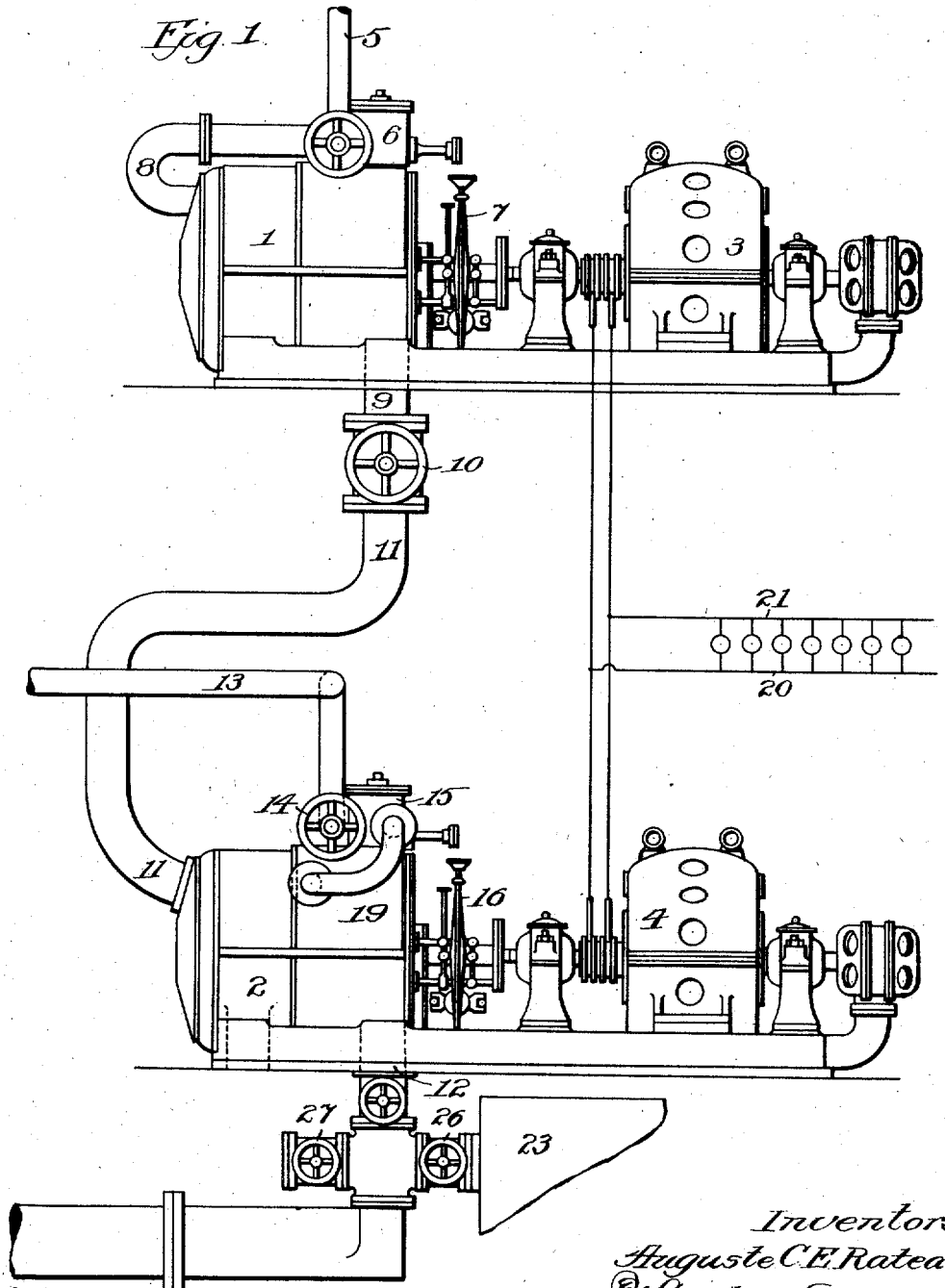

No. 12,526. REISSUED AUG. 28, 1906.

A. C. E. RATEAU & G. SAUTTER.

TURBINE OR OTHER ENGINE DRIVEN MACHINERY.

APPLICATION FILED JULY 20, 1906.

2 SHEETS—SHEET 1.

Witnesses:
Alfred H. Moore.
Irving MacDonald

Inventors:
Auguste C. E. Rateau,
& Gaston Sautter,
By Barton, Brunet & Folk
Att'ys.

No. 12,526. REISSUED AUG. 28, 1906.

A. C. E. RATEAU & G. SAUTTER.

TURBINE OR OTHER ENGINE DRIVEN MACHINERY.

APPLICATION FILED JULY 20, 1906.

2 SHEETS—SHEET 2.

Witnesses:

Alfred H. Moore.

Irving MacDonald

Inventors

Auguste C. E. Rateau

& Gaston Sautter,

By Burton Jenner & Cole

Att'ys.

UNITED STATES PATENT OFFICE.

AUGUSTE C. E. RATEAU AND GASTON SAUTTER, OF PARIS, FRANCE, ASSIGNORS TO RATEAU TURBINE COMPANY, OF CHICAGO, ILLINOIS, A CORPORATION OF WEST VIRGINIA.

TURBINE OR OTHER ENGINE DRIVEN MACHINERY.

No. 12,526. Specification of Reissued Letters Patent. Reissued Aug. 28, 1906.

Original No. 812,878, dated February 20, 1906. Application for reissue filed July 20, 1906. Serial No. 327,098.

*To all whom it may concern:*

Be it known that we, AUGUSTE CAMILLE EDMOND RATEAU and GASTON SAUTTER, citizens of the Republic of France, residing at Paris, France, have jointly invented certain new and useful Improvements in Turbine or other Engine Driven Machinery, of which the following is a specification.

This invention relates to the driving of electric generators or other power-transforming machines by turbines or other engines operated by steam, gas, or similar motive power; and its object is to provide an improved construction and arrangement which will utilize to the fullest extent the expansive power of the motive fluid and by which the total power developed thereby may be utilized most efficiently, as for the generation of electric currents.

The production of very heavy electric currents by turbine-driven generators has heretofore been attended with great difficulties, because of the very high speed at which a turbine necessarily runs. While it is possible to construct such turbines so as to develop enormous mechanical power, it is impracticable to construct a generator of corresponding power which is capable of being direct-driven by the turbine at the high speed which the turbine-shaft attains, such a speed being prohibitive for large generators.

Broadly, this invention comprises a plurality of engines or engine-sections connected in series with respect to the passage of the motive fluid, each driving one of a corresponding number of power-absorbing machines connected so as to react mutually to distribute the total load in proportion to the power developed by the respective engines, and a single governor mechanism, responsive to changes in the speed of the system for controlling the admission of motive fluid to the series. While this invention is not limited to the use of any particular type of engine, in practice it has been found that most efficient results are obtained by the use of turbine-engines. It is apparent, however, that other types of engines or combinations of different types may be employed and come within the scope of this invention.

In accordance with our invention the engine for developing the required total power is subdivided into high-pressure and low-pressure sections or individual engines, each section driving its own shaft, and a corresponding number of power-transforming machines, such as electric generators, are direct-driven, one by each of the several sections. The motive fluid is passed through said individual engines or sections in series to operate them together as a unit of motive power—that is to say, the motive fluid introduced into the first engine of the series is permitted to expand and develop mechanical power to a certain extent in said first engine, after which the partially-expanded steam discharged from the first engine is conveyed to the next engine of the series, and so on until the total energy of the steam is thus fractionally abstracted. The driven machines are connected in parallel with respect to the delivery of their output, so as to react mutually and distribute the joint load between them in proportion to the power developed by their respective driving-engines.

A further feature of the invention consists in the provision of a single regulator mechanism which acts in response to changes in the total load on the driven machines (as manifested by changes in speed of both machines) to control the admission of steam or other motive fluid to the first engine of the series.

Our invention further contemplates temporarily increasing the power delivered by the series of driven machines by supplying additional live steam or motive fluid to a convenient intermediate point in the low-pressure section of the engine. This enables the driven machines to work on overload at certain times when the demand is greatest or to maintain the normal power of the combined engines in case the condenser becomes inoperative and a discharge of the exhaust into the open air becomes necessary.

With the general arrangement of engines, driven machines, and regulating mechanism above described the individual driven machines may be of simple and strong construction and small in size so as to be capable of operation at high speed, while efficiency is maintained by the practical absorption of the total power of the engine, this being made possible by the division of said engine into high-pressure and low-pressure sections, each of which furnishes its proportionate part of the total required power.

Where a turbine-engine is employed, a further advantage of subdividing the turbine into two or more units lies in the fact that it is sometimes advantageous to run the high-pressure turbine at a greater rotative speed than the low-pressure section. This is in consequence of the fact that the low-pressure section has a greater diameter than the high-pressure section, and therefore cannot be rotated at so high a speed because of excessive mechanical strains. By subdividing the turbine and letting each turbine drive a generator, the generators being connected in parallel, this may be readily accomplished, provided the generators are designed to operate in parallel at different rotative speeds.

We will describe our invention in detail as embodied in a turbine-driven system by reference to the accompanying drawings, in which—

Figure 2:
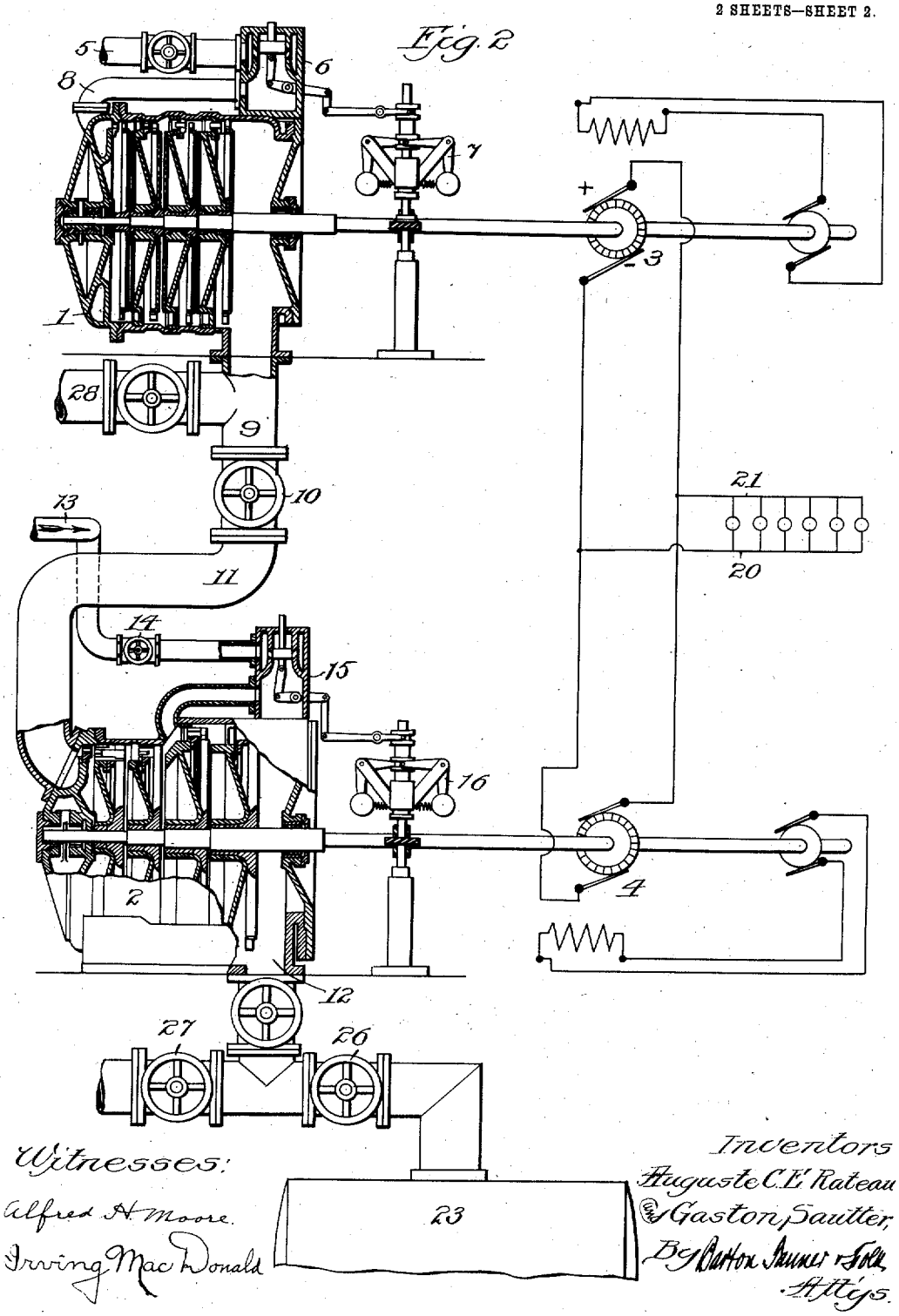

Figure 1 is a diagrammatic representation of a turbine-driven electric generator set constructed and arranged according to our plan, the generators being shown as alternating-current machines. Fig. 2 is a diagram showing the parts more in detail and indicating the driven machines as direct-current generators.

The same numerals of reference designate the same parts in both views.

As shown in the drawings, the turbine is divided into a high-pressure section 1 and a low-pressure section 2, each of which drives its own independent shaft. A dynamo-electric generator is direct-connected to the shaft of the high-pressure turbine 1, and a similar electric generator 4 is direct-connected to the shaft of the low-pressure turbine 2. In Fig. 1 the dynamos 3 and 4 are indicated as alternating-current machines, while in Fig. 2 said dynamos 3 and 4 are indicated as direct-current machines. In both cases the terminals of said machines are connected in multiple with the mains 20 and 21 of the circuit to be supplied. Such connection acts to distribute the total electric load between the dynamos 3 and 4 in proportion to the relative power developed by their respective driven turbines. The turbines are preferably constructed in accordance with our Patent No. 748,216, granted December 29, 1903, the present application being in substance based upon the application upon which said patent was granted. It is not essential to the present invention, however, that any particular type of engine be employed, except that it should be divided into high-pressure and low-pressure sections, each section driving its own independent shaft. The steam arriving from the boilers from the pipe 5 passes into the first distributers of the high-pressure turbine through the pipe 8, an obturator 6 being provided to control the quantity of steam so admitted. A certain proportion of the energy of the steam is expended in driving the high-pressure turbine 1, and from the exhaust-pipe 9 of said high-pressure turbine the steam is conveyed by way of pipe 11 to the low-pressure turbine 2. The steam after finishing its work in the low-pressure turbine 2 leaves through the exhaust-pipe 12 and may thence pass to a condenser 23. We have indicated in the drawings an outlet 24 into the open air for the steam from the exhaust 12 in case it is desired for any reason to cut out the condenser. We have also indicated in the drawings an outlet 28 for the steam from the exhaust-pipe 9 in case it is desired to cut off the low-pressure turbine altogether by closing the valve 10. It will be understood, however, that this is only for an emergency and that normally the exhaust-steam from the high-pressure turbine passes through the pipes 11 and 19 into the low-pressure turbine when it completes its work.

The compound turbine above described is controlled during its normal operation by a single regulating mechanism which may be associated with the high-pressure section 1. This mechanism comprises the obturator 6 and the speed-controlled regulating mechanism 7 of the usual type for operating the same. This regulator mechanism is sensitive to slight changes of speed above or below the normal rate. Upon undue increase in speed it acts through the connecting-lever mechanism to close the obturator 6, while if the speed falls below the predetermined rate said regulator acts to open the obturator and admit more steam. Variations of speed beyond the narrow limits determined by the governing mechanism are thus prevented, the speed being maintained substantially constant.

We preferably provide means for temporarily augmenting the power of the turbine when required to meet an extraordinarily heavy overload, such means consisting of a pipe 13, conveying live steam from the boiler to act on a section of the turbine which is intended for normal operation only at low pressure. As shown in the drawings such additional live steam may be introduced into an intermediate cell of the turbine 2, so as to act on the vane-wheels thereof toward the end of the series. The supply of such additional live steam may be controlled by a special obturator 15, which is governed by the regulating mechanism 16, the latter being shown as arranged to respond to changes in speed of the low-pressure turbine. This special regulating mechanism is adjusted to act only in response to a fall of speed greatly below normal, as in case of an abnormally heavy overload, under which conditions the admission of additional live steam to the low-pressure turbine will greatly increase its proportion of the total power delivered.

The operation of this apparatus is as follows: Under normal conditions the motive-fluid is supplied to the high-pressure turbine 1, the extent of this supply being controlled by the obturator, which admits sufficient steam to maintain the speed of this turbine at approximately its normal value. The steam then passes through the turbine, developing a portion of the total work required, which energy is delivered in the form of electric power by the direct-connected dynamo. The steam on exhausting from turbine 1 passes into the low-pressure turbine 2, where it completes its expansion, producing the rest of the available work contained in the steam, which work is converted into electric power by the direct-connected generator and delivered to the system. On passing through the second turbine the steam escapes through pipe 12 to the air or to the condenser, as may be required. The rotative speeds of both units are maintained at approximately the same value or at any predetermined approximately fixed ratio, dependent upon the design of the electric generators. The reason for this fixity of relative speeds is obvious in the case of an alternator, since the machines operating in parallel are compelled to operate at synchronous speeds by virtue of the synchronizing current which is exchanged between the two machines upon even a very slight departure from synchronous speed. In the case of direct-current generators connected in parallel the same result follows, however, for a somewhat different reason. In this case if either machine attains a speed above that for which it generates normal voltage its voltage will be increased accordingly and will therefore exceed the voltage of the other machine whose speed has not been increased. In consequence a current will flow in series through the machines, said current acting to drive the slower-speed machine as a motor and being generated by absorbing power from the higher-speed generator. On account of this action it is impossible for either generator to depart materially from the normal speed unless the other generator does so also. Consequently if the speed of either generator is controlled by a speed regulator or governor the speed of both generators is controlled. As a result of this mutual relation of generators connected in parallel the two turbines perform their functions in much the same manner that they would operate were both connected to the same shaft and controlled by a single governor, as is the usual practiec. Variations in the total load on the turbines will first cause an inverse variation in the rotative speeds of both sets, which speed variation actuates the governor on the first turbine of the series and changes the supply of steam in accordance with the change in load. Under all conditions, however, the power delivered by each generator is determined by the power generated by the steam in the corresponding turbine, except in cases where the speeds of the rotating elements are being accelerated or retarded. In this case some of the energy is supplied or absorbed by the acceleration of the rotating element. We have found that with this arrangement the most suitable means of governing the speed of both turbines is obtained when the first turbine in series is equipped with a governor which admits sufficient steam to the first turbine to maintain its speed at approximately the normal value for which the governor mechanism has been designed. The speed of the second or low-pressure unit is compelled to be approximately the same as that of the high-pressure unit by virtue of the electric generators of the two units being connected in parallel. It is obvious that since the speed of the two turbines must be practically the same one governor suffices to control the speed of both, although it actually controls only the speed of the first turbine. Two turbines operating in this manner are in nearly the same condition as they would be were the two turbines mechanically coupled together by a slightly elastic coupling, said coupling, in the case of an alternator, being elastic, but allowing no actual difference in the number of revolutions per minute of the two sets, while in the case of direct-current generators said coupling would be elastic and would permit a small difference in the rotative speed of the two units. It is thus obvious that two units arranged in this manner, controlled by a single governor, actuated by the speed of the first turbine in the series, insures that the steam-pressure distribution in the various sections of both turbines approximates very closely to the steam distribution which would be obtained were both turbines mechanically connected to the same shaft If each turbine were individually controlled by its own governor, said governor acting to throttle the admission of steam into said turbine, the distribution of steam-pressures between the two turbines will not be that which would be obtained with the two turbines connected to the same shaft unless some complicated means were provided for distributing the electric load between the generators in such a way as to compel this steam distribution. During normal operation the single regulating mechanism applied to the obturator 6 of the first turbine will suffice to keep the speed of the system approximately constant; but in case of an overload upon the mains 20 21 so heavy that the pull force of the steam admitted by the wide-open obturator 6 to the series of turbines is insufficient to furnish the required extra power the speed of the whole system will fall considerably below normal. The regulator 16, controlling the obturator 15, is adjusted to respond to such abnormal fall of speed and will under such conditions act to open said obturator 15 and admit live steam from pipe 13 to the turbine 2. There is thus added to the nearly-spent steam acting toward the end of the series of vane-wheels sufficient live steam to considerably increase the power developed by the turbine 2, and thus to meet the additional demand upon the generators. During the continuation of the overload the regulator 16 serves through variations in speed of the generator to regulate, through the obturator 15, the admission of live steam to the turbine, according as the overload upon the dynamos 3 and 4 is increased or diminished.

In the diagram Fig. 2 we have indicated the apparatus in the normal running condition, with the valve 6 open to admit steam to the first turbine of the series and the obturator 15 closed, as it would be during the normal operation.

We claim—

1. The combination with a plurality of engines connected in series with respect to the passage of the motive fluid, of a corresponding number of power-absorbing machines mounted on separate shafts and driven each by a corresponding one of said engines, and regulating mechanism responsive to changes in speed of the system, for controlling the admission of motive fluid to said series of engines.

2. The combination with high-pressure and low-pressure engines, and means for passing motive fluid through said engines in series to operate the same as a unit of motive power, of a corresponding number of power-absorbing machines driven each by a corresponding one of said engines, regulating mechanism responsive to changes in speed of the system and arranged to control the admission of motive fluid to said engines, and means for causing said power-absorbing machines to react mutually to distribute the total load in proportion to the power developed by the respective engines.

3. The combination with a plurality of engines connected in series with respect to the passage of the motive fluid to operate as a unit of motive power, of a corresponding number of power-transforming machines each driven by one of said engines, said machines being interconnected with respect to the delivery of their output, and a single governor mechanism, responsive to changes in the speed of the system, for controlling the admission of motive fluid to the first engine of the series.

4. The combination with a plurality of turbines connected in series with respect to the passage of steam, of a corresponding number of power-absorbing machines driven by said turbines, a connection between said driven machines to maintain approximately a fixed relative speed thereof, and a governor mechanism responsive to changes in speed of the system controlling the admission of steam to the first turbine of the series.

5. The combination with a plurality of turbines and means for conveying motive fluid through said turbines in series to operate the same as a unit of motive power, of a corresponding number of power-transforming machines each driven by one of said turbines, said machines being connected in parallel with respect to the delivery of their output, and a single governor mechanism responsive to changes in the speed of the system controlling the admission of motive fluid to the first turbine of the series.

6. The combination with two or more turbines and means for conveying motive fluid through said turbines in sequence to operate the same as a unit of motive power, of a corresponding number of power-absorbing machines driven each by a corresponding one of said turbines, a regulator mechanism responsive to slight changes in speed of one of said turbines and arranged to control the admission of motive fluid to said series of turbines, and means for causing said driven machines to react mutually to distribute the total load in proportion to the power developed by the respective turbines.

7. The combination with high-pressure and low-pressure turbines, and means for passing motive fluid through said turbines in series to operate the same as a unit of motive power, of dynamo-electric generators driven each by a corresponding one of said turbines, and a main circuit to which said generators are connected in parallel, whereby the load upon said circuit at any instant is distributed between said generators in proportion to the power developed by their respective driving-turbines.

8. The combination with high-pressure and low-pressure turbines, and means for passing motive fluid through said turbines in series, of electric generators driven each by a corresponding turbine, a main circuit fed with current from said generators, and connections between said generators adapted to distribute the total load of said main circuit between said generators proportionately to the power developed by their corresponding driving-turbines.

9. The combination with electric generators connected in parallel to a main circuit, of high-pressure and low-pressure turbines each driving a corresponding generator, means for causing motive fluid to pass through said turbines in series to operate the same as a unit, an obturator controlling the supply of motive fluid to the first turbine of the series, and a governor for operating said obturator, responsive to changes in the total load on said main circuit.

10. The combination with a plurality of turbines connected in series with respect to the passage of motive fluid therethrough, of a corresponding number of power-absorbing machines driven by said turbines, a connection between said driven machines, means for admitting additional motive fluid to an intermediate point in the turbine system, and a governor mechanism responsive to an abnormal fall of speed, arranged to control the admission of such additional motive fluid.

11. The combination with a plurality of turbines connected in series, of a corresponding number of power-transforming machines driven by said turbines, a connection between said driven machines whereby they are caused to maintain approximately a fixed relative speed, a governor mechanism responsive to changes of speed of the system arranged to control the admission of motive fluid to the first turbine of the series, means for admitting additional motive fluid to an intermediate point in the turbine system, and a second governor mechanism responsive to an abnormal fall of speed consequent upon overload, arranged to control the admission of such additional motive fluid.

12. The combination with a plurality of turbines and means for passing steam through said turbines in series, of electric generators driven one by each turbine, said generators being connected in parallel, a governor mechanism responsive to changes in speed of one of said turbines, controlling the passage of steam to the first turbine of the series, means for supplying additional steam at an intermediate point in the turbine series, and a second governor mechanism responsive to an abnormal fall of speed consequent upon overload, arranged to control such additional steam-supply.

AUGUSTE C. E. RATEAU.
GASTON SAUTTER.

In presence of—
JACK BAKER,
H. C. COXE,
FREDERICK ACHENBACH,
WM. BURGESS.